May 1, 1945.                C. A. OHL                2,374,887
                        SEAL CONSTRUCTION
                       Filed Dec. 16, 1942

Inventor

Clyde A. Ohl.

By N. D. Parker Jr.
   Attorney

Patented May 1, 1945

2,374,887

UNITED STATES PATENT OFFICE 2,374,887

SEAL CONSTRUCTION

Clyde A. Ohl, Elyria, Ohio, assignor to Bendix-Westinghouse Automotive Air Brake Company, Elyria, Ohio, a corporation of Delaware Application December 16, 1942, Serial No. 469,243

3 Claims. (Cl. 286—26)

This invention relates to sealing devices and more particularly to an arrangement for excluding the entrance of dirt, moisture and other foreign substances from the opening between a shaft and a supporting member.

There has been a long need in the art for inexpensive means of simple design and construction for effectively sealing the opening between a pair of members, such as a shaft and a supporting member therefor, to exclude the entrance of dirt, moisture and other foreign substances from such openings. Means of the foregoing character has extensive use in connection with fluid pressure actuating devices which are usually necessarily mounted in such locations as to be subject to the action of dirt, moisture and other foreign substances.

The principal object of the present invention is to provide the aforementioned means.

Another object is to provide novel means for preventing the entrance of dirt, moisture and other foreign substances into the opening between a shaft and a supporting member therefor, with the means so designed as to contact a small length of the shaft.

Another object is to provide a device, for sealing the opening between a shaft mounted for relative movement within a supporting member, of novel design and construction whereby the device contacts the shaft with a wiping action upon relative movement of the latter.

Still another object is to provide a sealing device having the foregoing characteristics including novel features for allowing the passage of air through the device while maintaining the sealing features.

Other objects and novel features of the invention will appear more fully hereinafter from a consideration of the following detailed description when taken in connection with the accompanying drawing which illustrates one embodiment of the invention. It is to be expressly understood, however, that the drawing is utilized for the purpose of illustration only and is not designed as a definition of the limits of the invention, reference being had for this purpose to the appended claims.

In the drawing, wherein similar reference characters denote similar elements throughout the several views.

Figure 1:
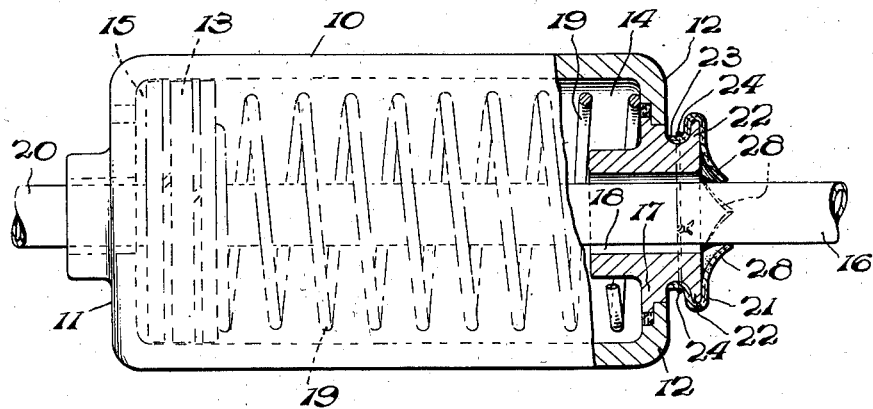
Fig. 1 is a diagrammatic showing, partly in section, of a fluid pressure actuating device including a sealing device embodying the principles of the present invention.

With reference more particularly to Fig. 1 of the drawing, a sealing device constructed in accordance with the principles of the present invention is disclosed therein in connection with a fluid pressure actuating device of the type employed for operating vehicle brake and clutch mechanisms. As shown, the fluid pressure actuating device comprises a hollow cylindrical casing member 10 having one end thereof closed by wall 11 while the other end is terminated in an inwardly extending circumferential lip 12. A piston 13 is slidably positioned within the hollow casing member 10 to divide the interior thereof into chambers 14 and 15. One end of an actuating shaft 16 is secured to the back face of the piston 13, while the other end thereof extends outwardly beyond the inwardly extending circumferential lip 12. The extending end of the actuating shaft 16 is connected to a mechanism, not shown, that the fluid pressure actuating device is adapted to operate. A cylindrical member 17, having an opening 18 therein through which the actuating shaft 16 extends, is secured to the periphery of the inwardly extending lip 12 by any suitable means. A coil spring 19 is positioned within the chamber 14, with the opposite ends thereof contacting the inwardly extending circumferential lip 12 and the back face of the piston 13, in order to normally urge the piston 13 to the left end of the casing member 10, as viewed in the drawing. The chamber 15 is connected to a source of fluid pressure through a conduit 20 that terminates in communication with the chamber 15.

When it is desired to operate the mechanism to which the terminating end of the actuating shaft 16 is connected, such as the brake or clutch mechanisms of a road vehicle for example, a source of fluid pressure is applied to the chamber 15 through the conduit 20. As the pressure of fluid supplied to the chamber 15 exerts a sufficient force on the front face of the piston 13 to overcome the tension of the spring 19, the piston 13 and the actuating shaft 16 are moved to the right, as viewed in the drawing. The extent of the foregoing movement of the actuating shaft 16 depends upon the forces opposing such movement of the actuating shaft and the force applied to the face of the piston 13 due to the fluid pressure applied to the chamber 15. By regulating the pressure applied to the chamber 15 any desired degree of movement of the actuating shaft 16 is obtained.

Since the periphery of the piston 13 must necessarily contact the inner wall of the casing member 10 in such a manner to prevent the flow of fluid pressure to the chamber 14, the latter chamber is connected to atmosphere in order to prevent air from being trapped in the chamber 14 and thus retard movement of the piston 13 against the tension of the spring 19. In view of the foregoing, the opening 18 in the member 17 is of a larger diameter than the diameter of the actuating shaft 16 in order to allow air to freely pass therethrough upon movement of the piston 13. Such larger diameter also permits a certain amount of lateral movement of shaft 16.

As previously mentioned, it is an object of the present invention to provide novel means for effectively sealing the opening between the contacting surfaces, or the closely related surfaces, of a pair of members, such as a shaft and a supporting member therefor. Sealing means of the foregoing character has numerous applications, for example, for sealing the opening between the actuating shaft and the body portion of a fluid pressure actuating device, such as the type previously described and illustrated in Fig. 1 of the drawing. As aforesaid, with reference again to Fig. 1, it is necessary to provide the opening 18 of a diameter substantially greater than the diameter of the actuating shaft 16 to allow air to freely pass through from the chamber 14 upon movement of the piston 13. Moreover, as stated heretofore, the fluid pressure actuating devices of the foregoing type are usually installed in positions wherein the devices are subjected to dust, dirt, moisture and other foreign substances. It therefore becomes necessary to provide suitable sealing means for the opening between the actuating shaft 16 and the support 17 in order to exclude the entrance of foreign substances from the interior of the casing member 10, but with the sealing means so characterized that air may freely pass therethrough.

Figure 2:
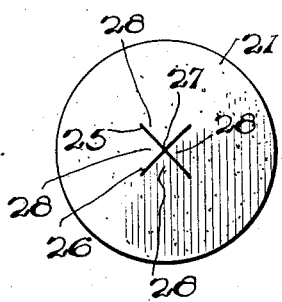
Fig. 2 is an end view of the sealing device shown in Fig. 1.
Figure 3:
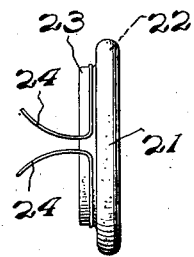
Fig. 3 is a plan view of the sealing device shown in Fig. 1.

As shown in Figs. 1, 2 and 3, the foregoing means comprises a thin sealing member 21, constructed of flexible material, such as leather for example. The sealing member 21 is secured to the cylindrical member 17, and portions thereof are maintained in contact with the outer surface of the actuating shaft 16 in such a manner that dirt, moisture and other foreign substances are excluded from the chamber 14, while air is allowed to pass freely therethrough, to and from the chamber 14.

In order to secure the sealing member 21 to the cylindrical member 17 in such a manner to accomplish the foregoing, the face of cylindrical member 17 is terminated beyond the inwardly extending circumferential lip 12, in a plane at substantially right angles to the longitudinal axis of the actuating shaft 16, while a circumferential boss 22 is formed on the periphery of the extending portion adjacent the terminating face thereof. The sealing member 21 is placed on the terminating face of the cylindrical member 17 and is deflected or otherwise formed over the circumferential boss 22 into and around the outer periphery of the cylindrical member 17, for a certain distance behind the boss 22, as shown at 23. A metallic wire 24, or any other suitable clamping means, is positioned over the sealing member 21, directly behind the circumferential boss 22, to rigidly clamp the member 21 to the terminating face of the cylindrical member 17 in a manner shown.

For a purpose that will become apparent hereinafter, the sealing member 21 is secured to the cylindrical member 17 in such a manner to maintain the sealing member 21 under a substantial stress. The foregoing is accomplished from the method of clamping the sealing member 21 to the cylindrical member 17. When the outer portions of the sealing member 21 are formed over the circumferential boss 22 and positively clamped to the outer periphery of the cylindrical member 17, at 23, the sealing member 21 is necessarily stretched from the normal state thereof thus producing the aforementioned pre-stressing.

The sealing member 21 has a pair of diagonal slits 25 and 26 cut therein, with the mid-points of each of the slits crossing at a substantially common point 27. The diagonal slits 25 and 26 form a plurality of slitted members, or flexible tongues 28, each of which extends inwardly toward the point 27 from a substantially circular path equally distant from the point 27. The length of each of the diagonal slits is equal to the diameter of the actuating shaft 16 so that the shaft may be readily inserted through the slitted portion of the sealing member 21. The sealing member 21 may be inserted over the actuating shaft 16 before the member 21 is secured to the cylindrical member 17, or the actuating shaft may be inserted through the slitted portion of the member 21 after the latter is rigidly secured to the cylindrical member 17, depending upon which mode of assembly may be more conveniently accomplished. In either event, the sealing member 21 is secured to the cylindrical member 17 in such a manner that the mid-points 27 of the diagonal slits 25 and 26 substantially coincide with the axial center of the actuating shaft 16.

When the actuating shaft 16 is inserted through the slitted portion of the sealing member 21 the flexible tongues 28 are deflected outwardly to allow the shaft 16 to pass through the slitted portion of the sealing member 21, as shown in Fig. 1. Since the sealing member 21 is secured to the cylindrical member 17 in such a manner that the midpoints 27 of the diagonal slits 25 and 26 substantially coincide with the center of the actuating shaft 16, the tongues 28 have equal areas of contact with the surface of the actuating shaft 16. Furthermore, since the length of each of the diagonal slits 25 and 26 is equal to the diameter of the actuating shaft 16, the entire circumference of the actuating shaft 16 is in contact with some portion of the sealing member 21.

As previously mentioned, the sealing member 21 is secured to the cylindrical member 17 in such a manner that the sealing member 21 is maintained under a substantial stress. With such pre-stressing of the sealing member 21, the tongues 28 are urged to occupy the normal positions thereof, that is, positions in a plane with the substantially larger portion of the sealing member 21 that is parallel to the terminating face of the cylindrical portion 17, with a substantially greater force with respect to the force urging the tongues 28 to occupy the aforementioned normal positions thereof when the sealing member 21 is not under a substantial stress. With the foregoing arrangement, a substantial force maintains the tongues 28 in continuous contact with the surface of the actuating shaft 16. The latter feature not only provides an efficient seal between the actuating shaft 16 and the cylindrical member 17, but also greatly prolongs the effective life of such a sealing device.

Since the sealing member 21 is constructed of leather, or of any other material having suitable flexible and absorbing characteristics, the entrance of moisture, such as water, to the chamber 14 through the opening between the cylindrical member 17 and the actuating shaft 16 is effectively prevented. The foregoing function of the sealing member 21 is effectively increased when a sealing device constructed in accordance with the principles of the present invention is employed to seal the opening between a supporting member and a relatively movable shaft carried thereby, for example, for sealing the opening between the longitudinally movable actuating shaft 16 and the cylindrical member 17. When the actuating shaft 16 longitudinally moves with respect to the sealing member 21, the tongues 28 contact the surface of the actuating shaft 16 with a wiping action. The wiping action of the tongues 28 continually maintains a large surface of the actuating shaft 16 free from moisture, thus preventing substantial quantities of moisture from gathering adjacent the contacting surfaces between the tongues 28 and the actuating shaft 16, which would eventually flow past the sealing member 21 into the chamber 14.

The present invention thus provides a novel device, of simple design and construction that may be manufactured at relatively low costs, for effectively sealing the opening between the contacting surfaces, or the closely related surfaces, of a pair of members, such as a shaft and a supporting member therefor. A sealing device constructed in accordance with the principles disclosed herein not only excludes the entrance of dirt and other foreign substances to the opening between a shaft and a support therefor, but also excludes the entrance of moisture, such as water for example, and is further characterized to allow air to pass therethrough. Moreover, the sealing device provided by the present invention includes novel features for maintaining a substantially long, efficient life of the sealing device, and furthermore, the sealing device is designed in such a manner that the same contacts a substantially small longitudinal length of the shaft to be sealed thus eliminating the necessity of increasing the length of the shaft for sealing purposes as is the case in certain sealing devices provided by the prior art.

Although only one embodiment of the invention has been described and illustrated herein it is to be expressly understood that various changes and substitutions may be made therein without departing from the spirit of the invention as well understood by those skilled in the art. For example, any number of diagonal slits may be cut in the sealing member while the lengths of the slits may vary in order to provide a slitted opening in the sealing member that substantially conforms with shafts having cross-sections other than circular. Reference therefore will be had to the appended claims as a definition of the limits of the invention.

What is claimed is:

1. In combination, a supporting member, a shaft protruding from said supporting member, and means sealing the opening between the adjacent surfaces of said supporting member and said shaft, said means including a substantially thin member of flexible material having a flat circular face, a plurality of diagonal slits in said face with the mid-points of said slits passing through a substantially common point, said flexible member being inserted over said shaft, and means securing said flexible member to said supporting member with said common point in substantial coincidence with the center of said shaft.

2. A seal for a reciprocating shaft comprising a cup-shaped member of leather having a flat, circular face provided with a plurality of intersecting slits intersecting at the center of said face.

3. A seal for a shaft comprising a cup-shaped member of leather having a flat, circular face provided with a plurality of slits of equal length, said slits intersecting each other at the center of said face.

CLYDE A. OHL.